3,152,880
HERBICIDAL COMPOSITION AND METHOD
Mark B. Weed, Wilmington, Del., assignor to E. I. du Pont de Nemours and Company, Wilmington, Del., a corporation of Delaware
No Drawing. Filed June 3, 1960, Ser. No. 34,618
2 Claims. (Cl. 71—2.5)

This invention relates to the discovery that a combination of a herbicidal aryl alkyl urea with aminotriazole surprisingly has herbicidal power not possessed by either component employed separately.

I have found that mixtures of herbicidal aryl alkyl ureas with aminotriazole give surprising herbicidal results. These combinations are more effective as weed killers than either herbicidal component used alone. The result is that the combinations have enhanced herbicidal effectiveness, particularly on broad-leaf rhizomatous weeds.

This enhanced effectiveness is particularly surprising inasmuch as the combination gives total kill of such pests whereas neither herbicidal aryl alkyl ureas nor aminotriazole when singly applied at equivalent rates will give such kill. By "rhizomatous weeds" I mean broadleaf and grass weeds which can spread vegetatively.

The aryl alkyl ureas used in the compositions and methods of this invention are 1-(p-chlorophenyl)-3,3-dimethylurea (monuron); 1-phenyl-3,3-dimethylurea (fenuron); and 1 - (3,4-dichlorophenyl) - 3,3 - dimethylurea (diuron).

The other herbicidally active compound employed in the compositions and methods of the invention is aminotriazole, which is the common name for 3-amino-1,2,4-triazole, a compound having the structural formula:

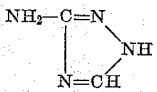

In operating in accordance with the present invention, any suitable amount of herbicidal aryl alkyl urea can be employed in combination with aminotriazole to obtain compositions in which the two herbicidal components are mutually activating. The relative proportions of the active components will vary depending upon the particular aryl alkyl urea employed, the plant species to be controlled, the physiological age of the plants, the prevailing climatic conditions, etc. It is impossible, therefore, to state exactly the proportions that will be used in all situations; and, indeed, the exact amounts of toxicants in the mixture do not appear to be critical. In general, however, the compositions of the invention will contain from about 0.10 to 20.0 parts by weight of the aryl alkyl urea for each part by weight of aminotriazole. In terms of proportions the relative amounts of each respective herbicidal component can be said to be from about 20:1 to 1:10, the ratios indicating the amount of urea to aminotriazole.

It is an outstanding advantage of the present invention that the total weight of herbicidally active ingredients used in the compositions and methods to produce kill of weeds is considerably more water soluble than the total weight of aryl alkyl urea needed to kill weeds. For example, one pound of monuron (1-(p-chlorophenyl)-3,3-dimethylurea) and one pound of aminotriazole comprises 55.7 percent by weight in solution in 50 gallons of water whereas 4.5 pounds of monuron alone is only 2.5 percent by weight in solution in 60 gallons of water.

Mixtures of monuron (10 to 20 pound per acre) and aminotriazole (5 to 10 pounds per acre) applied to a weed infestation on an industrial site give quicker top-kill and more outstanding residual control of weeds than a total amount of either compound alone.

A combination treatment of monuron (1 to 2 pounds per acre) and aminotriazole (0.5 to 1.0 pound per acre) gives outstanding control of quackgrass when applied in the spring to foliage (4 to 6 inches high). This combination has outstanding utility because at least 15 to 20 pounds of monuron—alone or 8 to 10 pounds per acre of aminotriazole—alone is required for control of quackgrass.

A combination of monuron (10 to 20 pounds per acre and aminotriazole (4 to 6 pounds per acre) applied to a mixed weed infestation containing poison ivy, milkweed, Canada thistle, crabgrass, foxtail, broomsedge, etc., gives excellent control of these species.

As has been noted above, the combinations of this invention are outstandingly effective for the destruction and prevention of rhizomatous weeds. When mixed in the proportions earlier indicated and applied to populations of rhizomatous weeds at the rate of about 3 pounds per acre the combinations completely kill both broad-leafed and grassy rhizomatous weeds.

The mixtures of the invention are also particularly effective for the destruction and prevention of Setaria species grasses. When mixed at the rate of about 3 pounds per acre and applied to populations of Setaria species grasses these combinations completely kill such weeds.

By the word "prevention" as used in this specification, I include soil sterilization.

It is much preferred to formulate the active components of the invention, comprising aminotriazole and aryl alkyl urea with conventional pest control adjuvants, modifiers, or diluents, hereinafter called inert carriers, because handling is facilitated and herbicidal action is thereby frequently enhanced. Such herbicidal compositions or formulations are prepared in the form of powdered solids or liquids.

The liquid compositions, whether solutions or dispersions of the active components in a liquid solvent, and also the wettable powders contain as a conditioning agent one or more surface-active agents in amounts sufficient to render a given composition containing the active components readily dispersible in water or in oil. By the term "surface-active agent" it is understood that wetting agents, dispersing agents, suspending agents, and emulsifying agents are included.

Suitable surface-active agents are set out, for example, in Searle U.S. Pat. No. 2,426,417, Todd U.S. Pat. No. 2,655,447, Jones U.S. Pat. No. 2,412,510, or Lenher U.S. Pat. No. 2,139,276. A detailed list of such agents is set forth in an article in "Soap and Chemical Specialties," vol. 31, No. 7, pages 50–61; No. 8, pages 48–61; No. 9, pages 52–67, and No. 10, pages 38–67 (1955), see also McCutcheon "Chemical Industries," November 1947, page 8011, entitled "Synthetic Detergents" and Bulletin E–607 of the Bureau of Entomology and Plant Quarantine of the U.S. Dept. of Agriculture. In general, less than 10 percent by weight of surface-active agent is present in the compositions containing the active herbicidal components of the present invention, and the amount of surface-active agent in any one composition may be as low as one percent by weight or even less.

Powdered or dust compositions of the invention, whether or not also modified with a surface-active agent, are prepared by mixing the active compounds of the invention with finely divided, inert carriers. Such carriers are preferably talc, natural clays, pyrophyllite, diatomaceous earth and flours such as walnut shell, wheat, soya, redwood and cotton seed flours. Other inert solids which can be used include magnesium, calcium carbonates, calcium phosphates, sulfur, lime, etc., either in powder or in granular form. The percentages by weight of the active components of the invention and the powdered or dust compositions of the invention will vary according to the manner in which the composition is to be applied, but in general, will be from about 0.1 to 95 percent by weight of the herbicidal composition.

Liquid compositions of the invention contain the insoluble active component homogeneously dispersed in water and the soluble component in solution. In sprays, the active components can be dispersed in water or other liquid carriers.

Herbicidal compositions containing the components of the invention can also be prepared by dispersing the compositions in an inert non-aqueous carrier. Aliphatic and aromatic hydrocarbons, for example, hydrocarbons of petroleum origin, are preferred as carriers. These dispersions are prepared by milling the compositions of the invention with dispersing agents and suspending agents and the inert liquid carriers in mills such as pebble mills. The amount of the herbicides in the dispersion can range from 10 percent or less to 40 or even 50 percent by weight of the oil dispersion.

Adhesives such as gelatin, blood albumen, resins, for example rosin, alkyd resins and the like, can also be used in certain compositions to increase retention or tenacity of deposits following application.

Compositions of the invention may be prepared in various ways as follows:

Wettable powders are prepared by combining in a blender the two active components in the desired ratio together with a fluffing diluent as a grinding aid, a wetting agent to assure easy preparation of an aqueous suspension and also a dispersing agent to prevent flocculation in water. These components are blended together, then passed through a hammer mill or other suitable grinding device until the particle size is substantially all below 50 microns. The product is then reblended until homogeneous.

Aqueous dispersions are prepared by mixing the active components, a dispersing agent, and a suspending agent with water and grinding in a pebble mill or sand mill until the insoluble particles are substantially all below 5 microns.

Oil dispersions are prepared in substantially the same way as aqueous dispersions but in this case the dispersing agent chosen is also an emulsifier for the oil so that the final product can be diluted with water to form a spray emulsion.

Pellets are prepared by blending the finely ground actives with a binding clay and, if rapid disintegration in water is desired, also a readily soluble salt. The blend is then moistened with 10-20 percent water and extruded through a die under high pressure to yield a compact pellet.

Granules are prepared by spraying an aqueous suspension-solution of the two active components upon a granular diluent such as granular attapulgite while tumbling the latter to obtain uniform deposition. Alternatively, granules may also be prepared from mixtures such as described for pellets above by mixing with larger amounts of water and forming in a commercial granulator such as the Stokes granulator and drying the product.

Dusts are most frequently prepared by diluting wettable powders with a dense, rapid settling diluent such as micaceous talc by blending the two together in a ribbon or cone blender. Alternatively, where wetting and dispersing agents are undesirable, the active components are first mixed with a minor amount of a fluffing diluent as a grinding aid, micropulverized and then blended with the dense major diluent.

The herbicidal compositions are applied as sprays, dusts or granules, or pellets to the locus or area to be protected from weeds. Such application can be made directly upon the locus or area to be protected and the weeds thereon during the period of weed infestation in order to destroy the weeds, or alternatively, the application can be made in advance of an anticipated weed infestation to prevent such infestation. Thus the compositions can be applied as aqueous foliar sprays or as sprays directly to the surface of the soil. Alternatively, the dry powdered granulated or pelleted compositions can be applied directly on the plants or on the soil. For some purposes it will be convenient to use pelleted or granular forms of the compositions such as in the treatment of pond and lake bottoms or in the treatment of vegetation where it is desirable to get the composition on the soil surface without depositing it on the plant foliage.

The active ingredients are, of course, applied in amounts sufficient to exert the desired herbicidal action. The amount of herbicidally active compounds present in the compositions as actually applied for destroying or preventing weeds will vary with the herbicidal activity of the active ingredients, the purpose for which the application is being made (i.e., whether for short-term or long-term control), the manner of application, the particular weeds for which control is sought, and like variables. Thus, if highly active ingredients are to be used for the control of weed infestations that plague food crops, the compositions containing the active ingredients are normally further diluted with a liquid to form a spray composition or with a powdered solid to give a dust containing relatively low concentration of active compounds. On the other hand, if used to sterilize soil as in the treatment of power line or railroad rights-of-way, one or more of the active ingredients may, if of relatively low order of activity, be used in high concentration. In general, the herbicidal compositions as applied in the form of a spray or a dust will contain from about 0.02 percent to 95 percent by weight of the combined herbicidally active components.

In general, however, the rate of application of active components of the invention will range from about 0.5 to 40 pounds per acre for herbicidal aryl alkyl urea compounds and from about 0.5 to 10 pounds per acre of aminotriazole. Certain particular usage rates that are generally found effective can be indicated, but it must be understood that the determination of the proper rate in any given instance is conventional procedure to those skilled in the art.

For sterilization purposes the amount of urea used can range from about 5 to 40 pounds per acre and the amount of aminotriazole used can range from about 5 to 10 pounds per acre. For pre-emergence purposes the amount of urea used can range from about 0.5 pound to 4 pounds per acre while for aminotriazole the amount used can range from about 0.5 to 4 pounds per acre.

As has been noted before, the compositions and methods of the invention are outstandingly useful as destroyers of rhizomatous weeds and Setaria species grasses. For instance, industrial sites are often infested with mixed weed populations which include sheep sorrel, quackgrass, Johnson grass, nutgrass, Bermuda grass, climbing milkweed, Canada thistle, and annual weeds including pigweed, crabgrass, broomsedge, foxtail (Setaria species) and other mixed weeds. When the combinations of the invention are applied to such infestations the weeds are destroyed and long-lasting weed control is obtained. In contrast, when such areas are treated with the herbicidally active components used separately at equivalent rates this high degree of control is not attained.

In order that the invention can be better understood the following examples are given in addition to the examples already given above. The examples illustrate typical herbicidal compositions of the invention, methods for their preparation, herbicidal applications, and the results obtained. The numbers following the tabulated ingredients represent parts by weight of the ingredients in the respective compositions unless otherwise noted.

*Example 1*

This composition is blended and ground by the method previously described for wettable powders. When diluted with water to spray concentration the urea forms an aqueous dispersion while the aminotriazole dissolved.

| | Percent |
|---|---|
| 1-(p-chlorophenyl)-3,3-dimethyl urea (monuron) | 40.00 |
| Aminotriazole | 40.00 |
| Alkyl naphthalene sulfonic acid, Na salt | 1.00 |
| Low viscosity methyl cellulose | 0.25 |
| Synthetic fine silica | 18.75 |

When this composition is mixed in 60 gallons of water and applied to the foliage of quackgrass at an active ingredient rate of 2 pounds per acre the quackgrass is killed.

*Example 2*

The following wettable powder is prepared in the manner previously described.

| | Percent |
|---|---|
| 1-(p-chlorophenyl)-3,3-dimethylurea (monuron) | 60.00 |
| Aminotriazole | 6.00 |
| Oleolyl ester of sodium isethionate | 1.75 |
| Sodium lignin sulfonate | 0.50 |
| Attapulgite | 31.75 |

When 5 pounds of this composition is mixed in 100 gallons of water and sprayed on a stand of quackgrass, the foliage and the rhizomatous weeds are killed.

*Example 3*

This emulsifiable oil solution-suspension is prepared in the manner described previously for oil suspensions.

| | Percent |
|---|---|
| 1-(p-chlorophenyl)-3,3-dimethyl urea (monuron) | 10 |
| Aminotriazole | 20 |
| Alkyl aryl polyether alcohol | 5 |
| Diesel oil | 65 |

When this composition is mixed in diesel oil and sprayed on a railroad ballast supporting a heavy population of rhizomatous and annual weeds at an active ingredient rate of 6 to 10 pounds per acre the weeds are killed.

Setaria species grass growing in this weed population are also killed.

*Example 4*

Ten pounds of a formulation containing 80% 1-(3,4-dichlorophenyl)-3,3-dimethylurea, 1.75% of an alkyl naphthalene sulfonate, 0.25% methyl cellulose (15 cps.), and 17.2% fuller's earth; and 20 pounds of a formulation containing 50% aminotriazole, 0.75% alkyl naphthalene sulfonate, 0.25% methyl cellulose (15 cps.), and 49% fuller's earth are added to 100 gallons of water in a spray tank. This mixture is applied at a volume of 100 gallons per acre to a mixed stand of brush and non-woody species composed largely of oak and Johnson grass. After several weeks the Johnson grass is chlorotic, and shortly thereafter all species are dead.

*Example 5*

This composition is prepared in the manner described previously for the preparation of extruded pellets.

| | Percent |
|---|---|
| 1-phenyl-3,3-dimethylurea (fenuron) | 25.0 |
| Aminotriazole | 1.7 |
| Clay | 62.3 |
| Anhydrous sodium sulfate | 10.0 |
| Alkyl naphthalene sulfonic acid, Na salt | 1.0 |

When these pellets are distributed by airplane to a mixed population of brush containing post oak, winged elm, and poison ivy at an active ingredient rate of 10 pounds per acre, good weed control is obtained.

*Example 6*

The following oil-water dispersible powder is adapted for use in the preparation of spray compositions using either an oil, water, or a combination of oil and water as the liquid diluent. The powders are made by mixing and grinding as described above.

| | Percent |
|---|---|
| 1-(3,4-dichlorophenyl)-3,3-dimethylurea (diuron) | 60 |
| 3-amino-1,2,4-triazole | 30 |
| Alkylated aryl polyether alcohol (wetting and dispersing agent) | 4 |
| Fuller's earth | 6 |

Three pounds of the above formulation is dispersed in 100 gallons of water and sprayed per acre on quackgrass foliage in the spring. Eight to ten days after spraying, the area can be plowed. This will result in good control of the quackgrass with no damage to corn planted a few weeks after plowing.

Six pounds of the above formulation is dispersed in 60 gallons of water and applied to a mixed population of annual weeds containing Setaria spp. grasses in an acre of sugar cane. The annual weeds including Setaria spp. seedlings are adequately controlled without noticeable injury to the sugar cane crop.

*Example 7*

The following composition is mixed and milled as described for aqueous dispersions.

| | Percent |
|---|---|
| 1-(3,4-dichlorophenyl)-3,3-dimethyl urea (diuron) | 30.0 |
| Aminotriazole | 5.0 |
| Sodium lignin sulfonate | 5.0 |
| Attapulgite hydrated | 2.0 |
| $Na_2HPO_4$ anhyd. (corrosion inhibitor) | 0.8 |
| Water | 57.2 |

The above formulation is mixed in water and sprayed on a mixed population of annual and perennial weeds in an area adjacent to an industrial warehouse at an active ingredient rate of 30 pounds per acre. All of the weeds are killed and the area remains free of weeds for at least 12 months.

*Example 8*

This wettable powder is prepared in the manner previously described for wettable powders.

| | Percent |
|---|---|
| 1-(p-chlorophenyl)-3,3-dimethyl urea (monuron) | 35 |
| Aminotriazole | 35 |
| Alkyl naphthalene sulfonic acid, Na salt | 1 |
| Sodium lignin sulfonate | 1 |
| Synthetic fine silica | 28 |

When this composition is mixed with 60 gallons of water and applied to the foliage of common foxtail (Setaria species) and climbing milkweed at an active ingredient rate of 3 pounds per acre, these weed species are controlled.

This application is a continuation-in-part of Serial No. 505,520, filed May 2, 1955, and now abandoned, and of Serial No. 718,955, filed March 4, 1958, now abandoned.

The embodiments of the invention in which an exclusive property or privilege is claimed are:

1. A process for the control of weed growth, said process comprising applying to a locus to be protected at least about 3 pounds per acre of a composition comprising 3-amino-1,2,4-triazole and at least one compound selected from the group consisting of 1-(p-chlorophenyl)-3,3-dimethylurea, 1-phenyl-3,3-dimethylurea, and 1-

(3,4-dichlorophenyl)-3,3-dimethylurea, the ratio of the urea to triazole ranging from 20:1 to 1:10.

2. A herbicidal composition comprising 3-amino-1,2,4-triazole and at least one compound selected from the group consisting of 1-(p-chlorophenyl)-3,3-dimethylurea, 1-phenyl-3,3-dimethylurea, and 1-(3,4-dichlorophenyl)-3,3-dimethylurea, the ratio of the urea herbicide to aminotriazole ranging from 20:1 to 1:10.

References Cited in the file of this patent

UNITED STATES PATENTS

| | | |
|---|---|---|
| 2,670,282 | Allen | Feb. 23, 1954 |
| 2,709,648 | Ryker et al. | May 31, 1955 |
| 3,014,965 | Newcomer et al. | Dec. 26, 1961 |

FOREIGN PATENTS

| | | |
|---|---|---|
| 549,769 | Belgium | Aug. 14, 1956 |